United States Patent
Hosain et al.

(10) Patent No.: US 8,219,090 B2
(45) Date of Patent: Jul. 10, 2012

(54) SYSTEM AND METHOD FOR SELECTION OF A CELLULAR NETWORK

(75) Inventors: Syed Zaeem Hosain, San Jose, CA (US); Robert B. Fultz, Boulder Creek, CA (US)

(73) Assignee: Aeris Communications, Inc., San Jose, CA (US)

( * ) Notice: Subject to any disclaimer, the term of this patent is extended or adjusted under 35 U.S.C. 154(b) by 845 days.

(21) Appl. No.: 12/350,442

(22) Filed: Jan. 8, 2009

(65) Prior Publication Data

US 2010/0173628 A1    Jul. 8, 2010

(51) Int. Cl.
*H04W 4/00* (2009.01)
(52) U.S. Cl. .................. 455/435.2; 455/433; 455/432.1
(58) Field of Classification Search .................. 455/433, 455/435.1, 435.2, 432.1, 437
See application file for complete search history.

(56) References Cited

U.S. PATENT DOCUMENTS

| | | | |
|---|---|---|---|
| 7,904,060 B2 * | 3/2011 | Krause ...................... | 455/414.1 |
| 7,983,672 B2 * | 7/2011 | Humblet et al. ........... | 455/432.1 |
| 2005/0059397 A1 * | 3/2005 | Zhao ......................... | 455/435.2 |
| 2009/0098872 A1 * | 4/2009 | Deshpande et al. ....... | 455/435.2 |

* cited by examiner

*Primary Examiner* — Lewis West
(74) *Attorney, Agent, or Firm* — Blakely, Sokoloff, Taylor & Zafman

(57) ABSTRACT

A system and method in a wireless communication device for receiving a System Identification Number (SID) from multiple wireless carriers operating within communication range of the wireless communication device, determining a signal quality level associated with each of the wireless carriers, determining a preference level for each of the wireless carriers based on a Preferred Roaming List (PRL), and selecting one of the wireless carriers based on the signal quality level of each wireless carrier and based further on the preference level for each wireless carrier.

17 Claims, 5 Drawing Sheets

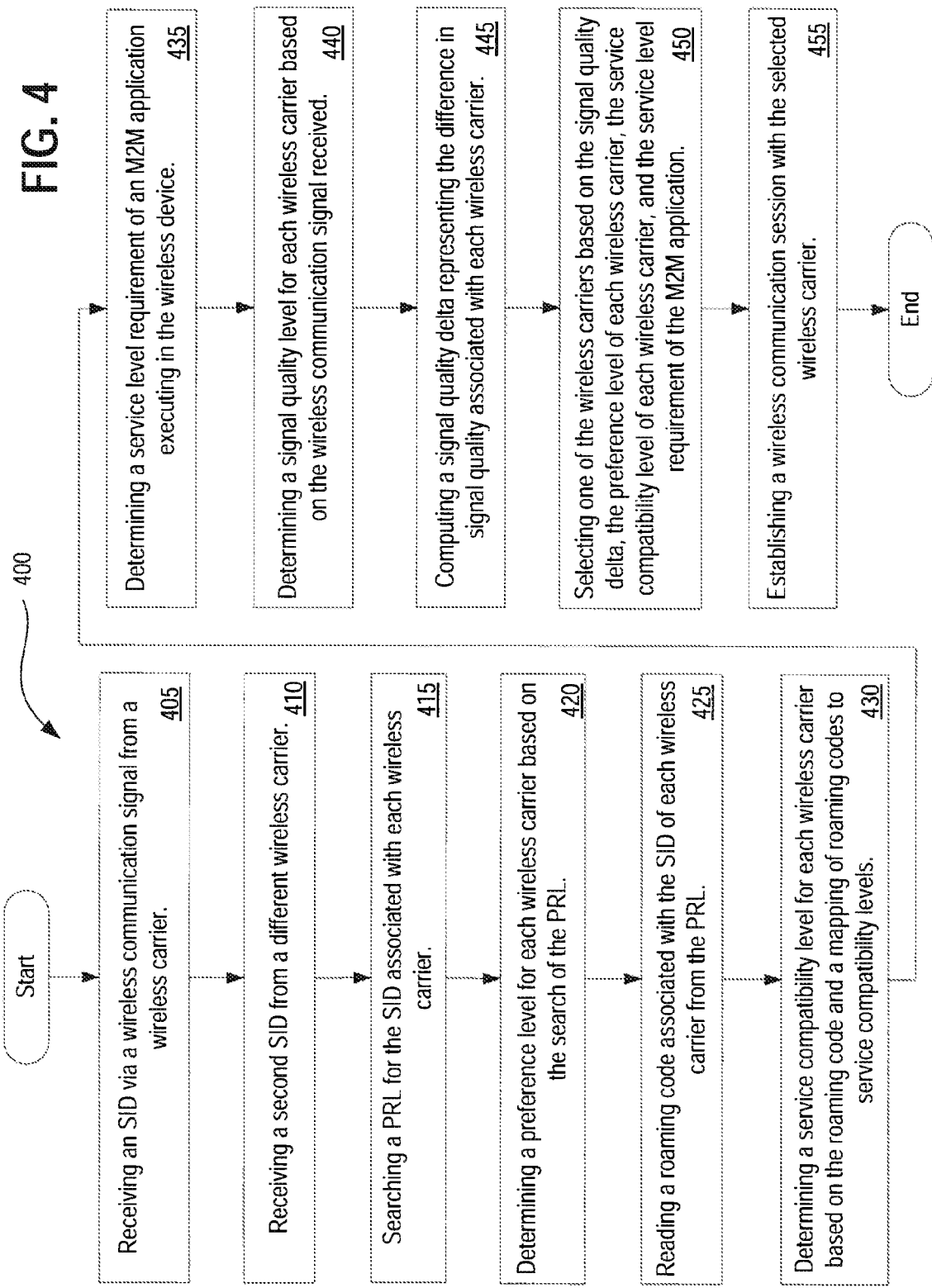

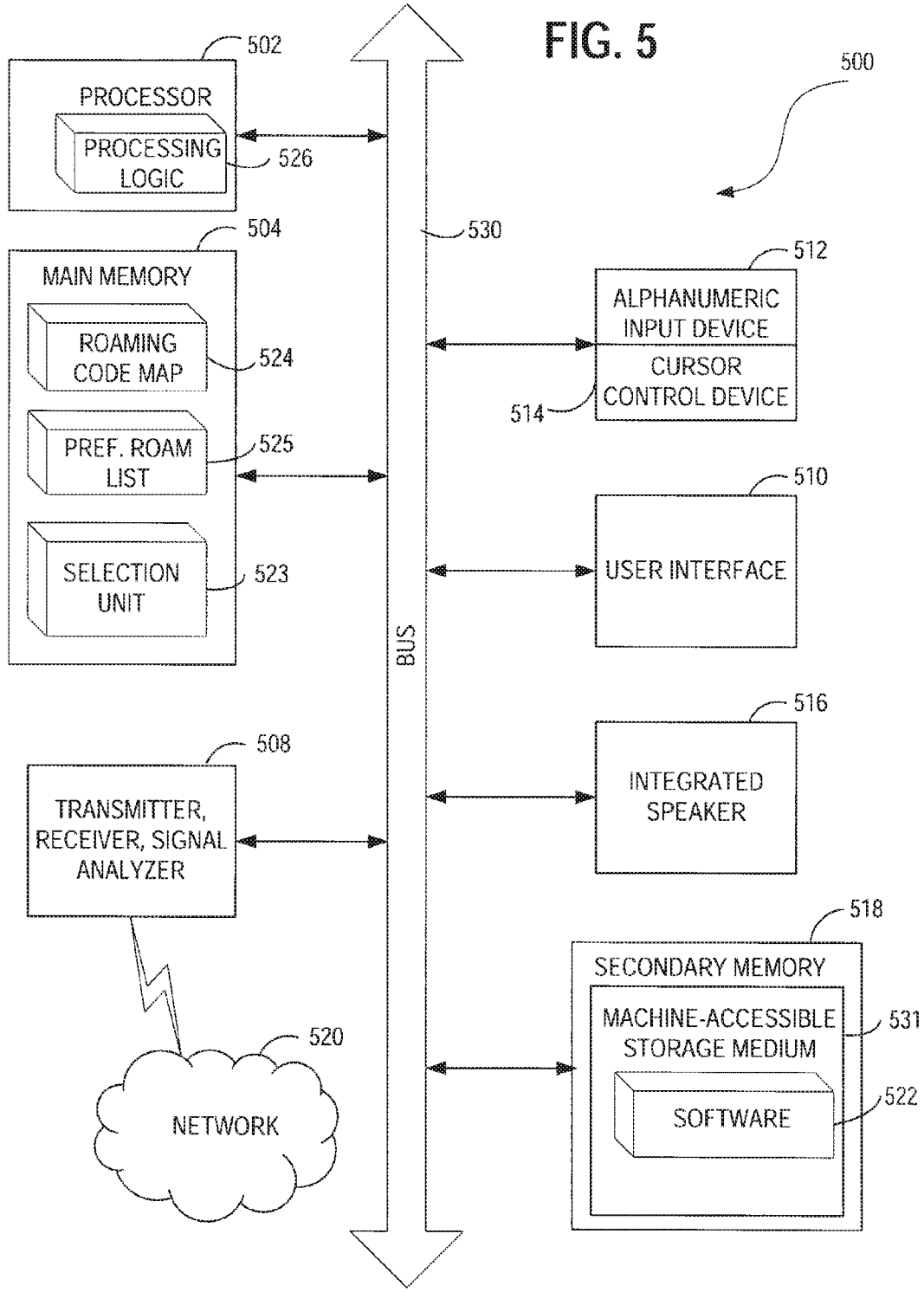

SYSTEM AND METHOD FOR SELECTION OF A CELLULAR NETWORK

TECHNICAL FIELD

Embodiments of the invention relate to the field of digital cellular network communications, and more particularly, to an improved system and method for selecting a wireless carrier network from multiple available wireless carrier networks.

BACKGROUND

Wireless carriers, such as Verizon™, Sprint™, Cricket Wireless™, and so forth, provide a variety of wireless telephony and data communication services around the world via wireless networks. Such services include wireless voice, data, text messaging, and so forth. A multitude of wireless networks, large and small, create a web of overlapping, sometimes inconsistent network accessibility. Depending on a user's geographic location, multiple wireless communication networks may be within communication range of the user's wireless device, yet each wireless network may potentially offer different types of services at varying levels of quality, and at different cost structures.

Large regional and national wireless carriers help simplify the complexity to end-users by offering subscription plans which allow a paying service subscriber to access the wireless carriers "home" network as well as "roaming" networks operated by other wireless carriers who have a business relationship with the home network wireless carrier.

Through these business relationships, a wireless carrier can greatly expand the geographic coverage area accessible to paying subscribers without having to extend the home network itself. The paying subscriber benefits from such inter-carrier business relationships through extended geographic coverage, and further benefits from convenient access to multiple networks through a single subscription plan.

The wireless carriers develop a complex list of preferences for various geographic zones based on the cost structure or other parameters stipulated by the contractual business relationships. For example, a wireless carrier will prefer to use its own home network infrastructure at a lower cost, rather than a contractually available roaming network, typically at a higher cost, regardless of quality.

In geographic areas where a home network is not accessible, a wireless carrier may have preferred contractual terms with a particular roaming network, but no agreement or unsatisfactory terms with another. In other situations, the wireless carrier may choose not to contract with any roaming network provider, despite the availability of such a network.

Each wireless carrier embodies these preferences in a "Preferred Roaming List" or "PRL" which is used to control a cellular telephone's selection or non-selection of available cellular networks in any given geographic area. The PRL lists by geographic region, networks accessible from that geographic region, and an order of preference for those networks. A cellular phone operating in a particular geographic area receives a System Identification Number (SID) from each network within communication range and selects the network identified by the wireless carrier as the most preferable.

Because the preferences are based on contractual relationships and preferences which are determined by the wireless carrier, a service subscriber may be denied service entirely, despite the availability of a cellular network, or the service subscriber may be connected with a network that does not offer desired services or provides unacceptable wireless signal quality in a particular geographic area, despite the availability of a cellular network that offers the desired services or provides superior wireless signal quality in that particular geographic area.

These problems are exacerbated for Machine-to-Machine (M2M) implementations which rely upon the cellular networks to transmit telemetry data, receive remote instructions, trigger automated alarms, or request emergency assistance. For example, consider a residential security system, installed in a fixed location, that is unable to notify authorities of an alarm condition because the cellular network deemed as "preferred" by the wireless carrier is not available or has inadequate signal quality and an available cellular network is deemed "less-preferred," despite being within communication range of the security system and capable of transmitting the requisite data.

BRIEF DESCRIPTION OF THE DRAWINGS

The present invention is illustrated by way of example, and not by way of limitation, and can be more fully understood with reference to the following detailed description when considered in connection with the figures in which:

FIG. 4 is a flow diagram illustrating a method within a wireless device for selecting a wireless carrier based upon available criteria, in accordance with one embodiment of the present invention; and FIG. 5 illustrates a diagrammatic representation of a machine in the exemplary form of a computer system, in accordance with one embodiment of the present invention.

DETAILED DESCRIPTION

Figure 1:
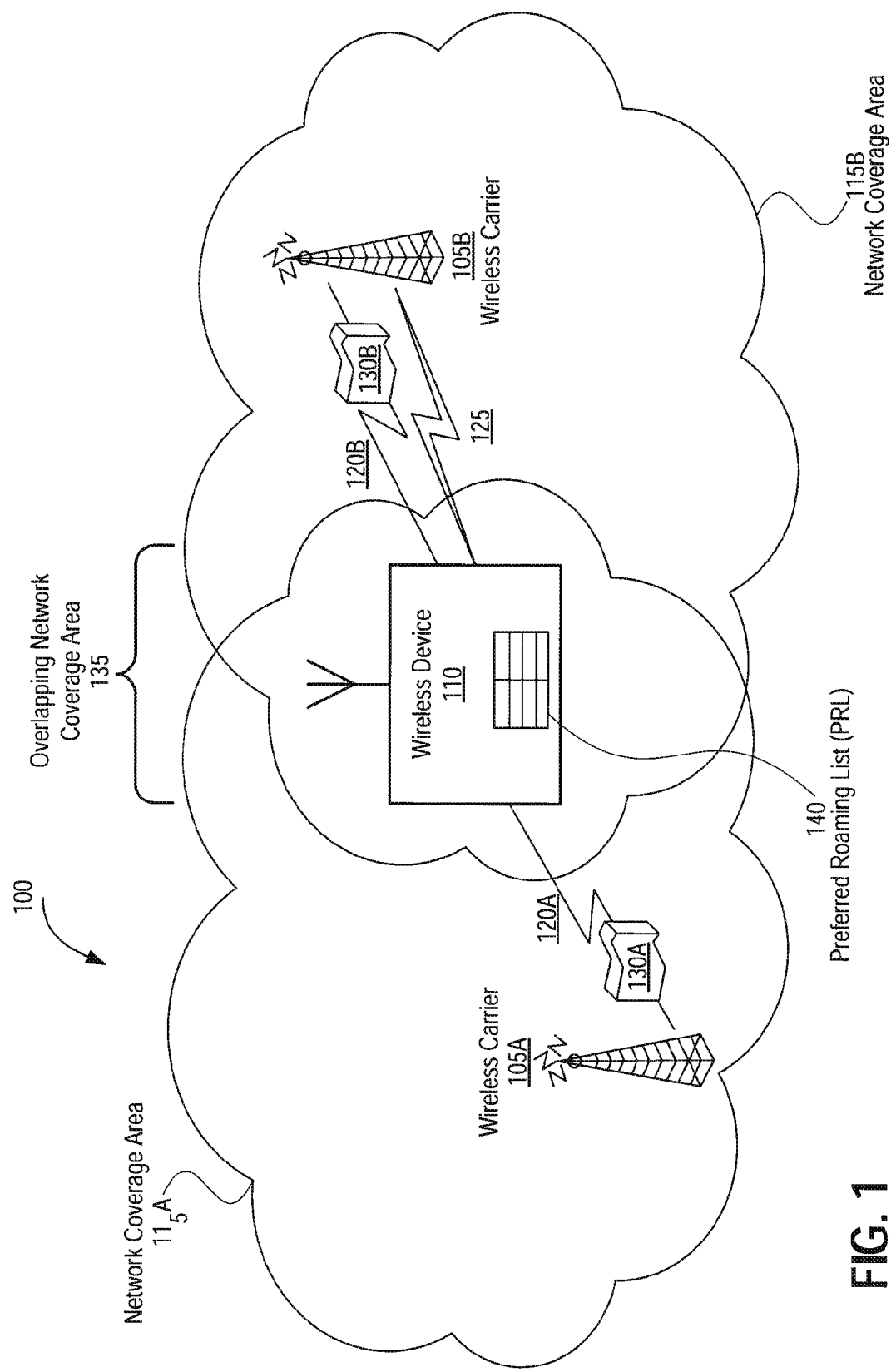
FIG. 1 illustrates an exemplary network architecture in which embodiments of the present invention may operate.

In the following description, numerous specific details are set forth such as examples of specific systems, languages, components, etc., in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

Described herein are a system and method for enabling a wireless device to select a wireless carrier from multiple wireless carriers available based on a signal quality level associated with each wireless carrier and based further on a preference level associated with each wireless carrier. More particularly, in one embodiment, a wireless device receives a System Identification Number (SID) from each of the available wireless carriers within communication range of the wireless device and compares the SID to a Preferred Roaming List (PRL) to determine a preference level for each respective wireless carrier. The wireless device further determines the signal quality level for each of the available wireless carriers, and then selects one of the wireless carriers based on the available criteria, such as the preference level of each network and the signal quality level for each network.

In some embodiments, the PRL may be modified so that a roaming code normally present in the PRL as a "0" value indicating a preferred "home" network or a "1" value indicating a preferred "roaming" network instead uses a full range of available values within the provided byte space (e.g., a 6-bit space offering 64 possible unique values) to provide a mapping of available services for each wireless network in a particular geographic area to the SID broadcast by each wireless network. Based on the proprietary mapping, a wireless device may further consider the communication needs of a wireless communication application executing at the wireless device as well as the service level compatibility of a particular wireless network as further selection criteria. For example, an application requiring data transfer services could select a less-preferred wireless network on the basis that it offers data transfer services over a more-preferred wireless network that offers voice services only.

Other considerations may be pertinent in such wireless network selection methods. For example, a service subscriber may have a contractual obligation to select a particular "preferred" wireless network over another wireless network operating in the same geographic area deemed as "less-preferred." However, the service subscriber may be excused from such a contractual obligation if, for example, the preferred wireless network does not offer the requisite service (e.g., offers voice service but does not offer data services), or if the preferred wireless network has a measured signal quality level more than, for example, 10 dB below than the measured signal quality level of a less-preferred wireless network. The 10 dB value may be different based upon application needs, or configurable within a particular application.

Enabling a wireless device to select a wireless network from multiple available wireless networks would enable service subscribers and wireless carriers to continue to negotiate and perform in accordance with complex contractual relationships which set forth otherwise arbitrary "preferred" and "lesser-preferred" wireless networks, while at the same time, balance the importance of such contractual relationships and network preferences against actual functional considerations that affect a deployed device, such as the ability to connect, maintain communications with, and utilize the wireless network in question. Such concepts are described in further detail below with specific reference to the Figures.

FIG. 1 illustrates an exemplary network architecture 100 in which embodiments of the present invention may operate. The network architecture 100 may include Wireless carriers 105A and 105B, each of which provide a corresponding wireless network such as that depicted by network coverage area 115A and 115B respectively. Overlapping network coverage area 135 depicts, for example, a geographic area where both wireless carriers 105A and 105B provide wireless network service. Wireless device 110 is depicted as operating within the overlapping network coverage area 135, and thus, can access the corresponding wireless network of both wireless carrier 105A and wireless carrier 105B. Wireless device 110 includes a Preferred Roaming List (PRL) 140. Wireless device 110 receives a System Identification Number (SID) 130A or 130B, from each wireless network operating within communication range of the wireless device via a wireless communication signal 120A and 120B and may establish a wireless communication session 125 with one of the wireless networks provided by wireless carriers 105A and 105B to access wireless communication services available via the corresponding wireless carrier.

A wireless device 110 may be a conventional cellular telephone compatible with wireless communication networks, such as those provided by wireless carriers 105A and 105B, a personal computer which includes a wireless communication device to interface between the computer and wireless communication networks, a smart phone capable of running applications, or a Machine-to-Machine (M2M) communication device, whether mobile or stationary, which is adapted to monitor, measure, and/or record telemetric data, possibly analyze the data and trigger automated events, receive instructions, or simply report back data to a central monitoring location.

Examples of M2M communication devices may include a residential security system which notifies proper authorities when an event is detected, for example, when a fire is detected by the device based on measurements taken, or a security breach is detected. A stationary M2M device may record utility meter usage of a gas, electric, or water meter and report back to a central utility company the amount of resources consumed by a particular customer. A mobile M2M device may be installed on a semi-tractor trailer and used to report Global Positioning System (GPS) data, fuel consumption, engine and mechanical diagnostic information, and so forth. Other stationary wireless communication devices may include a roadside emergency telephone which allows for voice communication. Such a device may also report M2M telemetry data, for example, GPS location information, weather information, or digital images and video, or carry voice traffic—for example, using Voice over IP (VoIP).

Wireless devices 110 may be deployed in locations and environments where wireless communication technology is preferred over conventional land-line communications technology due various reasons. For example, wireless devices 110 may be deployed in geographically remote areas where conventional land-line technology is not available (e.g., a rural highway), deployed in locations where a wireless device 110 needs to operate independently of a customer-provided communication line (e.g., a wireless device to monitor a utility meter without relying on the customer's residential telephone line), or deployed into mobile applications which cannot be tethered to a physical land-line connection (e.g., a wireless communications device installed into a vehicle or other mobile application).

Wireless devices 110 are dependent upon wireless carriers 105 for wireless communication services. Wireless carrier 105 may be a telecommunications company that provides wireless voice services, wireless data services, wireless messaging services, wireless paging services, and so forth. Wireless carrier 105 may operate a wireless communications network infrastructure that communicates over a licensed band of wireless spectrum and operates in accordance with well known wireless communication protocols. Such protocols may include, for example, a Universal Mobile Telecommunications System (UMTS) compatible protocol, a Global System for Mobile communications (GSM) compatible protocol, a Code Division Multiple Access (CDMA) compatible protocol, a GSM+CDMA dual mode wireless carrier protocol, a Worldwide Interoperability for Microwave Access (WiMAX) compatible protocol, Long Term Evolution (LTE), and so forth.

Wireless devices 105 actually communicate directly with a wireless network access point (e.g., an antenna, cell tower, base station, satellite, etc.) which is communicatively interfaced with well known wireless communications infrastructure such as Radio Network Controllers (RNCs) which manage antennas, Mobile Switching Centers (MSCs) which interface with other wireless carriers and conventional land-line communication systems to exchange wireless communication traffic, and various service providers which offer an array of services.

Each wireless carrier 105 provides a corresponding network coverage area 115 which may be established by one or more physical wireless network antennas or access points associated with the wireless carrier 105. For example, the wireless network coverage area 115 may be established by multiple antennas deployed over a relatively large geographic area, or conversely, may be established by a single antenna which provides a relatively small geographic coverage area. Regardless of the supporting infrastructure which provides for the network coverage area 115, such an area corresponds with locations from which a wireless device 115 can establish a wireless communication session 125 with a wireless carrier and exchange wireless communication traffic.

Wireless carrier 115 utilizes a broadcast mechanism to notify all compatible devices (e.g., wireless device 110) operating within its corresponding network coverage area 115 of the presence of the wireless carrier's network access point. The broadcast mechanism does not target specific devices, but rather, broadcasts a signal which carries basic information to every device capable of receiving wireless communication signals 120 from the wireless carrier 105, without regard to whether that device is a known subscriber of the wireless carrier or even authorized to access the wireless network.

Wireless carrier 115 broadcasts a System Identification Number (SID) 130 across network coverage area 115 via wireless communication signal 120. Wireless devices 110 operating within the corresponding network coverage area 115 receive the wireless communication signal and extract the SID from it to determine the identity of the wireless carrier 105 broadcasting the signal and in effect, advertising the presence of an access point into the wireless carrier's 105 wireless network. With the SID 130, a wireless device 110 can search its Preferred Roaming List (PRL) 140 for a record matching the SID and read corresponding information from a table that is associated with the wireless carrier's SID.

The PRL 140 includes a table of information which can be used by wireless devices 110 to identify available wireless carriers operating within a particular geographic area and determine which, if any, of those wireless carriers are appropriate use in establishing a wireless communication session 125 over which the wireless device 110 can access wireless communication services.

Overlapping network coverage area 135 depicts, for example, a geographic area where multiple wireless carriers (e.g., 105A and 105B) provide access to wireless network services. Wireless device 110 is depicted as operating within the overlapping network coverage area 135, and thus, at least from a technological standpoint, can potentially access both wireless carrier 105A and wireless carrier 105B from within the overlapping network coverage area 135.

Overlapping network coverage areas 135 are common in many areas of the world. Overlapping coverage 135 may be due to commercial competition amongst rival wireless carriers, each carrier deploying its own infrastructure so that it can offer better services, better pricing, better geographic coverage, and so forth. Overlapping coverage 135 may also result from technology upgrades. For example, many areas of the United States are covered by older analog based cellular technology while newer digital cellular technology has been deployed near higher-density urban centers and suburbs. As wireless carriers deploy newer, better, and faster technology, it is common for a single geographic location to be within wireless communication range of multiple wireless networks, some utilizing new technology, other utilizing older technology.

A user of a conventional cellular telephone typically has no control or choice over which wireless networks are available to it, even in geographic areas where multiple wireless carriers 105 provide network coverage. Wireless carriers 105 generate, deploy, and frequently update their PRLs 140 which dictate which wireless networks a conventional cell phone may join. Wireless carriers 105 use the PRLs 140 to implement financial, business, and contractual considerations which reflect the wireless carriers' business strategy.

Consider for example, a wireless carrier that operates out of Texas. The wireless carrier may operate its own network infrastructure covering urban and suburban areas of Texas, but have only sparse network infrastructure throughout rural areas of Texas, and have no infrastructure whatsoever outside of Texas. It is presumably cheaper for the wireless carrier to provide wireless services via its own existing network infrastructure than to pay a competitor to provide wireless services. Accordingly, the wireless carrier will implement preferences within PRL 140 ensure its own networks are used over other potentially available wireless carriers in overlapping geographic areas corresponding with its own network infrastructure.

This same wireless carrier operating out of Texas may desire to provide rural wireless coverage to its customers, despite its lack of network infrastructure. Thus, the wireless carrier may negotiate a contractual agreement or partnership with another wireless carrier having network infrastructure in rural Texas with which to provide wireless services. The wireless carrier will then "prefer" its own network infrastructure where available, but then "prefer" the partner carrier's infrastructure as a second choice. Similarly, the wireless carrier may contract with carriers outside of Texas to provide national coverage to its customers, or the wireless carrier may, via PRL 140, elect to prohibit use of wireless carriers outside of Texas, or require additional payment for the use of lesser-preferred wireless carriers outside of Texas.

Using PRL 140, a wireless carrier 105 can control whether a conventional wireless cell phone is authorized by the wireless carrier 105 to access a wireless network within communication range of the cell phone based on pre-determined business considerations. Even if multiple wireless carriers 105 are available to a single wireless device 110 operating, for example, in the overlapping network coverage area 135, the wireless device 110 may be prohibited from accessing any of the wireless carriers 105 based on a system table and specified preferences within the PRL 140.

Figure 2:
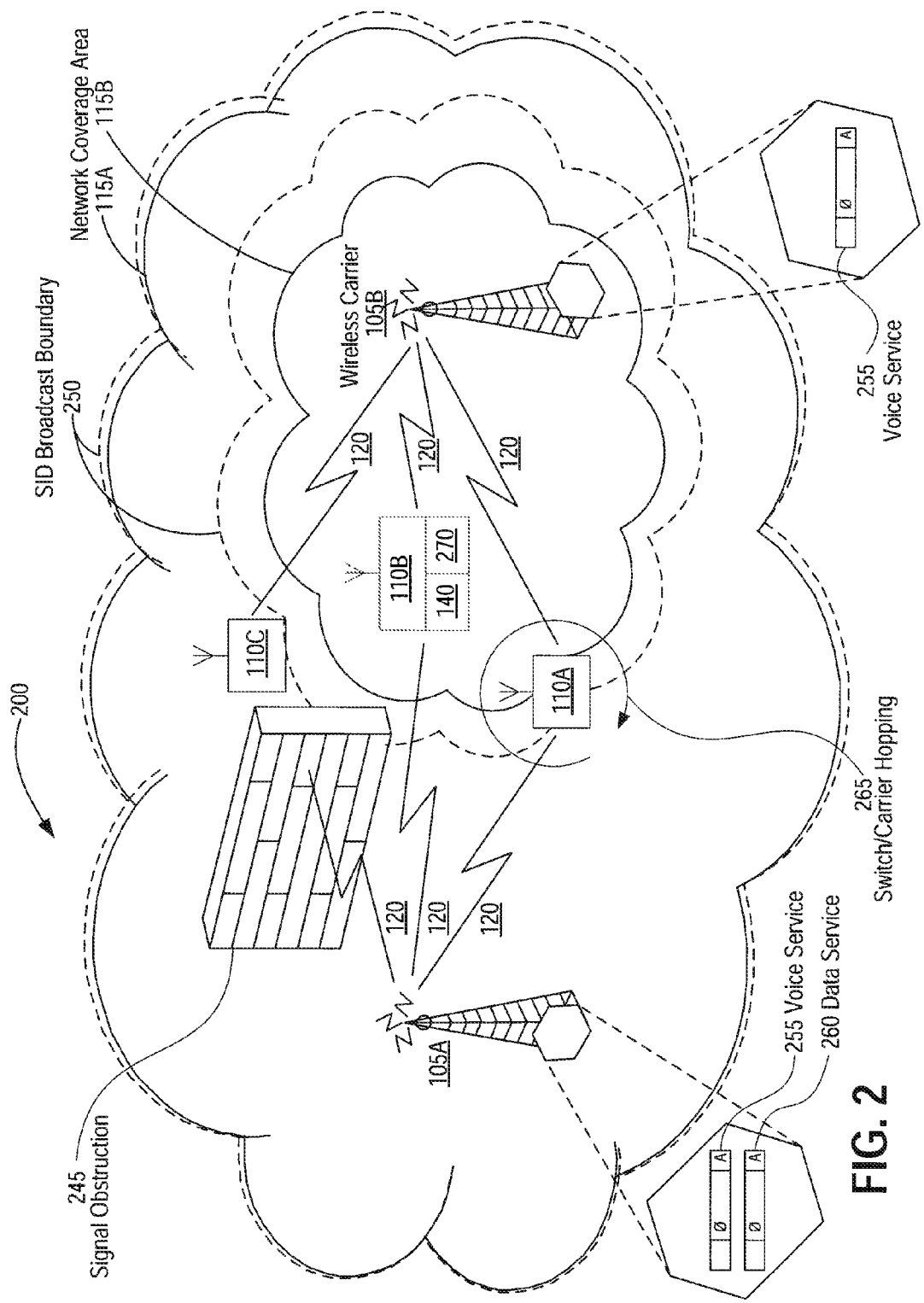
FIG. 2 is an alternative view of an exemplary network architecture in which embodiments of the present invention may operate.

FIG. 2 is an alternative view of an exemplary network architecture 200 in which embodiments of the present invention may operate. Network architecture 200 may include wireless carriers 105A and 105B. Each wireless carrier provides a corresponding network coverage area 115A and 115B respectively, and each network coverage area has a corresponding SID broadcast boundary 250. Wireless carriers 105A and 105B each provide voice services 255 and wireless carrier 105A additionally provides data services 260. Wireless carriers 105A and 105B broadcasts their SID to wireless devices within communication range via wireless communication signals 120. Wireless device 110A is within communication range of both wireless carriers 105A and 105B and is depicted as hopping between carriers or switches (e.g., switch/carrier hopping 265). Wireless device 110B is within communication range of wireless carriers 105A and 105B, and wireless device 110C is within network coverage area 115A associated with wireless carrier 105A but is affected by signal obstruction 245.

Each wireless device 110 may have distinct wireless communication service requirements based on its operating environment and intended use. For example, a wireless device 110 installed in a consumer vehicle for purposes of voice communication (e.g., a car phone) may only require voice services. Further still, such a device may be able to utilize both analog and digital voice services, and thus, require only one or the other in order to satisfactorily perform its intended function.

Conversely, a more sophisticated wireless device 110 installed into a semi-tractor trailer may support voice communications, but such a device may also support M2M telemetry reporting capabilities which may require a wireless data service. Other M2M enabled wireless devices 110 on the hand may prefer wireless data services for transmission of telemetry information collected by the device, yet support digital to analog conversion of the telemetry information so that data can be transmitted over a wireless voice service when necessary. Further still, some wireless devices may support a single communication protocol, such as MicroBurst™ data transfers, Short Message Service (SMS) message transfers, Open Mobile Alliance Device Management (OMA-DM) data transfers, and so forth. While support of every conceivable communication transfer protocol would be convenient, support for each requires development time and cost and adds complexity as well as heightened hardware requirements for each protocol that a wireless device 110 supports.

Although multiple wireless carriers 105 may be operating within a particular geographic area common to a particular wireless device 110, it is likely that each wireless carrier 110 supports a varying selection of wireless communication services and protocols, regardless of what overlap may exist. Even if all the wireless carriers 105 operating in a particular area completely overlap in the type of wireless communication services and protocols supported, it is nevertheless unlikely that each wireless carrier 105 provides such services at identical quality and reliability levels. Further differences still may exist in the wireless carriers' billing rates, contract terms, and so forth.

Consider for example wireless carrier 105A which is shown to support Voice service 255 and further supports data service 260. Wireless carrier 105B on the other hand supports only voice service 255. Wireless device 110B is shown to be within communication range of both wireless carriers 150A and 105B as it is positioned interior to network coverage areas 115A and 115B respectively. Wireless device 110B may be rendered inoperable if its embedded application 270 requires access to data services 260 from wireless carrier 105A, and yet wireless carrier 105B is selected based on PRL 140 preferences. Although both wireless carriers 105A and 105B are accessible to wireless device 110B, a conventional PRL would not enable the wireless device to determine what services are available via the respective wireless carriers, nor does a conventional PRL allow the wireless device to select a wireless carrier on the basis of services provided.

However, in accordance with one embodiment, wireless device 110B may receive an SID from each of wireless carriers 115A and 115B via a wireless communication signals 120, compares each SID received with PRL 140 stored within wireless device 110B, identify the service level compatibility for each of the respective wireless carriers 105A and 105B, and select the wireless carrier with the highest "preference" level according to PRL 140 that meets the minimum service level requirements of the application responsible for the wireless communication attempt (e.g., application 270). For example, if application 270 requires only voice service 255 and such a service is provided by both wireless carriers within communication range, then wireless device 110B will select the wireless carrier having the highest preference level according to PRL 140, as each supports voice service 255. If, however, application 270 requires data services 260 and such a service is only available from wireless carrier 105A, wireless device 110B will select wireless carrier 105A, even when another wireless carrier is identified as having a higher preference level according to PRL 140.

Various wireless communication services and protocols offered by the wireless carriers may include, for example, analog voice protocols, digital voice protocols, Internet Protocol or packet based data protocols, MicroBurst™ communication protocols, Short Message Service (SMS) communication protocols, text messaging or instant messaging communication protocols, and so forth. Various wireless carriers 105 may offer a selection of wireless communication services at various quality levels (e.g., sampling rates, compression rates, data speed rates, etc.) and may provide their services at different costs or contract terms. Further, due to the nature of wireless communication technology, a deployed wireless device 110 may experience different quality and reliability levels, even from the same wireless carrier 105, based on environmental factors such as geographic location, geographic terrain, physical obstacles and obstructions, electromagnetic signal interference, and so forth.

Wireless devices 110 may consider other selection criteria besides an indicated preference of a particular wireless carrier 105 and available wireless communication services (e.g., 255 and 260). For example, wireless device 110 may further consider environmental operational characteristics associated with each wireless carrier.

Although a wireless device 110 may be within communication range of a particular wireless carrier 105 sufficient to receive an SID 130 and establish a wireless communication session 125, the wireless device 110 may not necessarily be able satisfactorily transfer information (data, voice, messaging, etc.) via that wireless communication session 125.

The SID broadcast boundaries 250 associated with each of wireless carrier 105A and 105B respectively, illustrate this problem. Generally speaking, a wireless carrier 105 that is broadcasting an SID 130 throughout a corresponding network coverage area 115 is able to reliably broadcast its SID 130 over a greater geographic area than the same wireless carrier 105 is able to satisfactorily transmit and receive wireless communication traffic with a wireless device 110. Stated from the perspective of a wireless device 110, a wireless device 110 is generally capable of receiving an SID 130 from a geographic location which is more distant (or more obstructed) than a geographic location from which the same wireless device 110 can satisfactorily transmit and receive wireless communication traffic.

The space or gap between an SID broadcast boundary 250 and a corresponding network coverage area 115 associated with a particular wireless carrier has the potential to create a geographic region in which a wireless device is unable to exchange wireless communication traffic with any wireless carrier, notwithstanding the availability of multiple wireless carriers. Such a phenomenon is sometimes referred to colloquially as a "dead zone." This dead zone phenomenon presents itself when a wireless device 110 is able to receive an SID from a "preferred" wireless carrier 105, yet unable to establish a satisfactory wireless communication session 125 with the preferred carrier. Even though the wireless device 110 is unable to exchange wireless communication traffic with the preferred carrier 105, the wireless device will nevertheless disqualify (e.g., exclude or ignore) other lesser-preferred wireless carries which may be available to it. The wireless device 110 will continue to select the "preferred" wireless carrier 105 until that wireless carrier's SID is no longer being received by the wireless device 110.

Consider for example wireless device 110A which is positioned approximately in the space between the SID broadcast boundary 250 and the network coverage area 115B associated with wireless carrier 105B. If the wireless device prefers wireless carrier 105B, it may receive an SID 130 from both wireless carrier 105A and 105B, select wireless carrier 105B based on a preference indicated within its PRL, and subsequently fail to establish a wireless communication session 125 with wireless carrier 105B or establish such a session and fail to exchange wireless communication traffic with wireless carrier 105B due to its weak or lower-quality connection to wireless carrier 105B. In this example, wireless device 110A will continue to ignore the availability of the lesser-preferred wireless carrier 105A until such time that an SID is no longer received from the preferred wireless carrier 105B.

Another problem associated with wireless devices 110 selecting from the availability of multiple wireless carriers 105 is a phenomenon where a single wireless device 110 continuously jumps or "hops" between multiple available wireless carriers 105. Hopping may include hopping within the same carrier, typically due to signal quality rather than the lesser-preferred/most preferred phenomenon. When a wireless device 110 connects to a "most preferred" wireless carrier 105, it stops searching for a more preferred wireless carrier. Conversely, when a wireless device 110 connects with a lesser-preferred carrier, it persistently searches for a more preferred carrier, and then switches to the more preferred carrier once located. Consequently, a wireless device that is operating within a network coverage area 115 associated with a lesser-preferred wireless carrier 105, but near or marginally within a network coverage area 115 associated with a more preferred wireless carrier 105, will hop back and forth between the lesser-preferred and more preferred wireless carrier 105 due to intermittent or sporadic availability of the network coverage area 115 associated with the more preferred wireless carrier 105.

For example, a wireless device may connect to a more preferred wireless carrier with a very weak connection. Due to the weak connection, the wireless device may be dropped from the more preferred wireless carrier and connect instead to the lesser-preferred carrier with a good connection. Because the wireless carrier is deemed lesser preferred, the wireless device will search for a connection available from a preferred wireless carrier, receive an SID from the preferred wireless carrier, disconnect from the lesser-preferred wireless carrier and re-connect with the preferred wireless carrier, which most likely, continues to suffer from poor wireless connectivity. The cycle then repeats again, with the wireless device being dropped from the preferred carrier, hopping over to the lesser-preferred carrier, and searching again for a preferred carrier. The problem may be most acute with a device that is in a fixed location and cannot physically move to improve its operational behavior.

Carrier hopping 265 (depicted by wireless device 110 of FIG. 2) is problematic to a wireless communication device, as it generates additional communication overhead, drains battery power, creates time-periods or lapses when wireless communications must be interrupted due to the switching process, and further creates timing and synchronization issues of communication traffic in transit. Timing and synchronization issues are especially problematic with M2M applications which may lack proper intelligence to identify the presence of a carrier hopping 265 condition. For example, an M2M wireless device 110 may transmit a message through wireless carrier 105B and then unexpectedly hop to wireless carrier 105A. The recipient of the message (e.g., a monitoring station) may receive the original message and transmit a response, however the response may be lost as the wireless device is no longer connected to the original wireless carrier.

Yet another problem associated with wireless communications results when a preferred wireless carrier is available, but does not support the necessary services required by the wireless device. For example, a wireless device 110 installed at a residential utility meter may be configured to transmit IP based data packets back to a central monitoring location. A lesser-preferred wireless carrier 105 may support such IP data services, yet the preferred wireless carrier 105 in that geographic location may support only voice services. Consequently, the wireless device will be unable to transmit the telemetry data that it has collected (e.g., the customer's utility meter readings and usage) back to a programmed destination, despite being within sufficient communication range of a wireless carrier that provides support for IP based data services.

Signal obstructions 245 may also prevent a wireless device (e.g., wireless device 110C) from properly establishing, or disrupt an existing, wireless communication session 125 with a particular wireless carrier (e.g., wireless carrier 105A), despite being able to receive an SID 130 from that wireless carrier 105. Signal obstructions 245 can be temporary (e.g., a large truck driving by a house) or long-standing (e.g., a grove of large trees). Signal obstructions 245 may also be intangible, such as interfering radio waves, radiation, or other sources of electromagnetic interference.

Figure 3:
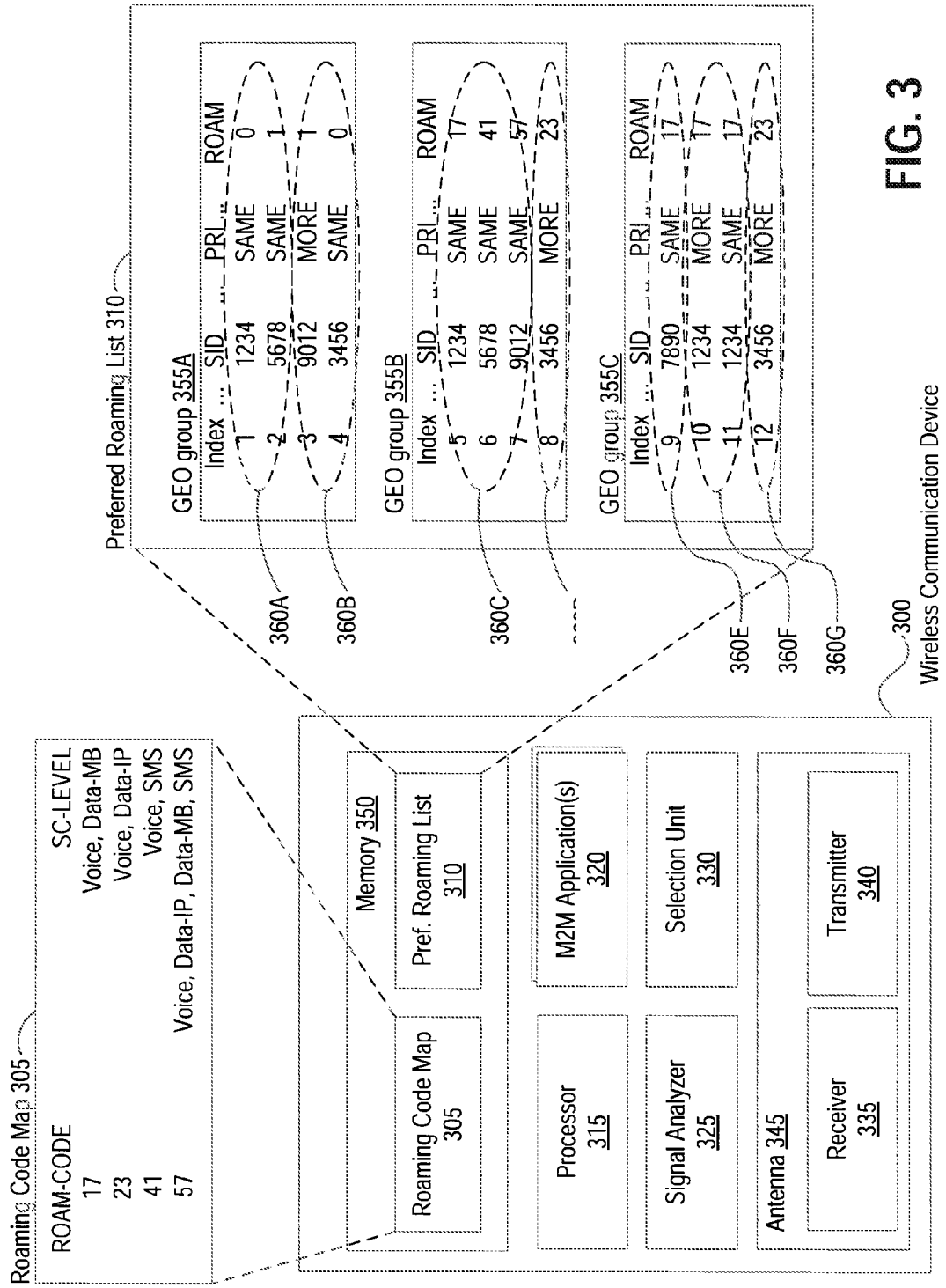
FIG. 3 is a diagrammatic representation of a wireless device in accordance with one embodiment of the present invention.

FIG. 3 is a diagrammatic representation of a wireless device 300 in accordance with one embodiment of the present invention. Wireless device 300 is shown with many components, some of which are optional in some embodiments.

Memory 350 provides volatile and non-volatile storage capabilities within wireless device 300. Memory 350 may include Random Access Memory (RAM) or equivalent operational memory, and may further include permanent storage, such as Read Only Memory (ROM), Non-Volatile Random Access Memory (NVRAM), Flash memory, Hard Disk Drive (HDD) storage, optical storage, and so forth. Memory 350 contains Roaming code map 305 and Preferred Roaming List (PRL) 310. Memory 350 may further contain a copy of M2M application 320 which may execute with the aid of processor 315 (e.g., a Central Processing Unit (CPU)). Memory 350 may further work in conjunction with signal analyzer 325 and selection unit 330 to effectuate functionality associated with such components.

The Preferred Roaming List (PRL) 310 depicted at FIG. 3 illustrates a system table which is organized into several distinct GEO groups 355A, 355B, and 355C, and further organized into several distinct columns. Each row of the table is identified by a unique key identified by the column header labeled "index." The wireless communication device 300 may be configured to search the system table of the PRL 310 from top to bottom, and thus, it may be beneficial to organize the PRL in such a way that geographic areas most likely to be used are searched first.

For example, in one embodiment, SIDs associated with a home market for a particular wireless device 300 are organized at the top of the PRL 310, neighboring regional market SIDs are listed next, near the top of the PRL 310, but after the home market SIDs, and more distant market SIDs are listed after the neighboring regional markets, based on their geographic proximity to the home market associated with the wireless device 300. For example, if the wireless device has a home market of San Francisco, Calif., the SIDs associated with wireless providers that offer wireless communication services may be listed first within the PRL 310, as such providers are the most likely to be used by the wireless device. Neighboring markets such as Sacramento and Los Angeles may be listed next, and geographically distant markets such as New York City and Miami may be listed near the end of the same PRL 310 as such markets are deemed, in this scenario, to be utilized the least.

Other grouping schemes may also be used, such as placing SIDs associated with the largest urban centers near the top, and smaller towns near the bottom. In a particular embodiment, a geography or "GEO" column may be used to segment the PRL 310 into various geographic groups.

The "SID" column within PRL 310 indicates which SID is associated with a particular row or record. The SID column may be used as a look-up field for the PRL 310. For example, in one embodiment, the wireless device 300 receives an SID from a broadcasting wireless carrier and searches the SID column of the PRL 310 for the first record having an SID field value that matches the SID received from the broadcasting wireless carrier. For example, if SID "7890" was received from the broadcasting wireless carrier, the wireless device would search, starting from the top, through GEO group 355A and 355B without finding the corresponding record, and then at record index "9," within GEO group 355C, SID "7890" is found. Once the record is obtained, the wireless device can read other fields from the same record, such as the "PRI" or priority field and the "ROAM" or the roaming code field.

The "PRI" or priority column indicates the priority level of a particular SID within a certain geographic area which corresponds to the GEO groups 355. For example, SID "7890" noted above belongs to priority group 360E, for which it is the only SID in the priority group. When an SID is found to be of the highest priority within a particular GEO group 355, it is deemed to be "preferred" to other SIDs within the same GEO group 355. When an SID is preferred, the wireless device may be configured to no longer search for a more preferred SID, since SIDs in other GEO groups 355 are presumably not accessible and other SIDs within the same GEO group are less preferred. Similarly, if an SID having the same priority as other SIDs within the same priority group, such as SID "9012" within priority group 360C, the wireless device 300 may be configured in such a way that it does not switch to the another SID within the same priority group 360 when those other SIDs are deemed to be equal in terms of their preference level.

Conversely, a wireless device 300 that connects with a wireless carrier having an SID in a lesser-preferred or lesser-preferred priority group will continue to search for an SID associated with a more preferred wireless carrier within the same GEO group 355. For example, a wireless device 300 connected with the wireless carrier corresponding to SID "3456" from priority group 360D will continuously attempt to connect with a wireless carrier associated with one of the SIDs identified within priority group 360C.

SIDs may be repeated within the PRL 310 for various reasons. For example, SID "1234" is shown to operate as a preferred wireless carrier in GEO groups 355A and 355B, but as a less preferred wireless carrier in GEO group 355C. Similarly, SID "1234" is listed twice within priority group 360F, likely because the same wireless carrier operates on multiple channels or frequency bands within the same market, and each is of equal priority. Priority groups 360A through 360G may enforce business preferences such as contractual terms, billing rates, or partnership agreements, and the various priority groups 360 may be peculiar to each distinct wireless carrier based on business justifications for their particular business.

The ROAM or roaming code column is used in conventional cellular telephones to indicate whether the phone is subject to "roaming charges," such as increased billing rates, or operating within a "home" market where lower billing rates are typically incurred. Conventional cellular telephones use a "0" to indicate a home market or a non-zero, commonly "1" to indicate that a particular SID is associated with a "roaming" market. Using the roaming code field, conventional phones indicate to a user that a particular market is subject to roaming charges.

In the present invention, the roaming codes within the ROAM column of PRL 310 may be used to indicate the Service Compatibility Level (SC level) of a particular SID, or the SC level of a wireless carrier associated with the SID. For example, index rows 5, 9, 10, and 11 each reflect a roaming code of "17," index row 7 corresponds with a roaming code of "57," and index rows 8 and 12 indicate a roaming code of "23." Each distinct roaming code may be used to lookup a corresponding SC level of a particular wireless carrier using a roaming code map 305.

The roaming codes stored within PRL 310 can be any number within the allowable byte space allocated to that field. For example, roaming codes may range from 0-63 in a 6-bit byte space. Roaming codes may be mapped in any of several ways, for example, roaming codes may be enumerated to correspond with a list of specified services, for instance, "17" may be mapped to voice and data, "57" might represent voice and SMS, "23" may represent data only, and so forth, depending on the particular roaming code map 305. Roaming codes may be mapped based on a scheme, for example, "1" represents voice, "2" represents voice, and "3" doesn't correspond with a service, but can be derived to represent services "1" and "2" or indicate that both voice and data are available.

Roaming code map 305 provides the mapping scheme or correlation map between the specified roaming codes associated with particular SIDs and the SC levels of those SIDs. Regardless of how mapped, a roaming code for a particular wireless carrier can be looked up based on the SID and once the roaming code is determined, logic within the wireless communication device 300, such as functionality within the M2M application, can access the roaming code map 305 to determine which services are available from the wireless carrier broadcasting the SID received. In the example roaming code map 305 provided in FIG. 3, roaming code "17" corresponds with an SC level of voice and MicroBurst™ data transfer. Similarly, roaming code "23" corresponds, according to the map shown, with an SC level of voice and IP based data transfer. Roaming code "41" corresponds with voice and SMS messaging, and roaming code "57" corresponds with an SC compatibility group consisting of voice, IP based data transfer, MicroBurst™ data transfer, and SMS. SC levels may be based on standardized lists, or simply represent groups or combinations of wireless communication services peculiar to a particular roaming code map 305, or a particular manufacturer, and so forth.

Signal analyzer 325 may provide additional data and measurements to the wireless device 300 for purposes in determining which of multiple available wireless carriers to establish a wireless communication session with. For example, signal analyzer 325 may measure and report objective characteristics associated with a particular wireless communication signal, such as Bit Error Rate (BER), Signal-to-Noise Ratio (SNR) representing the ratio of signal power within the corresponding wireless communication signal in comparison to the amount of noise power corrupting the wireless communication signal, a Frame Error Rate (FER) representing the number of frames within the corresponding wireless communication signal containing bit errors, Received Signal Strength Indication (RSSI) representing the power or intensity of a wireless signal as measured in deciBels below 1 milliWatt (dBm) at the wireless device 300), latency, voice compression and sampling rates, data throughput speeds, and so forth, to determine a signal quality level.

Signal analyzer 325 may measure the wireless communication signals (such as wireless communication signals 120 of FIG. 1) of all or a subset of the multiple wireless carriers operating within communication range of the wireless device and derive a signal quality level value for each that the wireless device 300 may use in its determination of which of several wireless carriers to establish a wireless communication session with.

Antenna 345 of wireless device 300 includes receiver 335 and transmitter 340. The receiver 335 accepts wireless communication signals from wireless carriers and passes the information associated with the signal to the wireless device 300. For example, the receiver may pass an SID received via a wireless communication signal to the wireless device 300, metrics about the wireless communication signal (e.g., SNR, BER, RSSI, FER values, etc.) to the signal analyzer 325 of the wireless device 300, or wireless communication traffic received over a wireless communications session to the wireless device 300.

Transmitter 340 is responsible for transmitting information from wireless device 300 to a target wireless carrier over, for example, a wireless communication session or brief data messages, acknowledgements, and so forth.

M2M application 320 is responsible for functionality (executed by processor 315) within the wireless device 300. The M2M application 320 may directly or indirectly control the other components of the wireless device 300 and may influence or control the selection of a wireless carrier from multiple available wireless carriers. Moreover, there may be multiple M2M applications 320 within a single wireless device 300. Also, other applications within the wireless device 300 may be configured to interact directly with a user via a user interface, and transmit information to a remote location based on such interactions.

Each M2M application 320 has minimum service level requirement which specifies the minimum level of wireless communication services that must be available for the M2M application 320 to carry out its specified function. More sophisticated and complex M2M applications 320 may support the same functionality over a variety of wireless communication services and communication protocols, whereas others may only support a single protocol or a limited number of protocols. An M2M application 320 that supports multiple communication protocols (e.g., data transfer over analog voice, digital voice, and IP packet based data channel support) may specify a preference or priority sequence for the various protocols supported. Further, M2M applications 320 may require a minimum threshold signal quality level or communication speed to function properly.

For example, in one embodiment, a commercial security system embedded in a wireless device 300 supports multiple wireless communication protocols to ensure maximum redundancy. In another embodiment however, a residential utility meter monitoring device embedded in a wireless device 300 supports only SMS messaging to achieve lower complexity, lower costs, and lower data transfer charges.

Selection unit 330 provides logic and functionality to select a particular wireless carrier from multiple wireless carriers within communication range of the wireless device 300. Selection unit 330 may consider information available to it through wireless device 300 such as a preference level of a particular SID based on information stored within the PRL 310, signal quality levels based on information obtained, received, or available from the signal analyzer 325, based on service level requirements of M2M application 320, based on protocol preferences of M2M application 320, based on service compatibility levels of a particular wireless carrier using information stored within the roaming code map 305, and so forth.

For example, in one embodiment, selection unit 330 may select a wireless carrier from multiple wireless carriers available based strictly on a preference level specified within PRL 310. In another embodiment selection unit 330 may determine the preference level for each wireless carrier available, compare a wireless signal quality level associated with each available wireless carrier against a threshold, and select the wireless carrier with the highest preference level that meets or exceeds a specified threshold.

In another embodiment, the selection unit 330 may select the most preferred available wireless carrier and compare its associated wireless signal quality level against a threshold, and when the signal quality level is below a specified threshold, search for an alternate wireless carrier having a signal quality level that exceeds the signal quality level by a specified delta. For example, if the preferred wireless carrier has a signal intensity of −85 dBm and the threshold is −90 dBm, the selection unit 330 would accept the preferred carrier. However, if the threshold was −92 dBm and a less-preferred wireless carrier had a signal intensity of −90 dBm, the selection unit 330 may compare the difference between the two signal intensities (e.g., −90 dBm for the lesser-preferred carrier less −100 dBm for the preferred carrier yields a difference of 10 dB) and select the less preferred wireless carrier when the difference meets or exceeds a specified minimum signal intensity delta (such as a 10 dB delta minimum).

In a particular embodiment, the selection unit 330 determines and evaluates the service level requirements of an M2M application 320 and compares those requirements against a service compatibility level of a preferred wireless carrier. For example, if an M2M application has a service level requirement specifying that either SMS or IP-Data are acceptable and the preferred wireless carrier is determined to have a service compatibility level of "Voice and SMS" based on the roaming code map 305, then the selection unit 330 would accept the preferred wireless carrier. Conversely, if the service compatibility level was specified as "Voice only" and the M2M application requires either SMS or IP-Data, the selection unit would not accept the preferred wireless carrier as doing so would fail to provide the minimum services required by the M2M application 320 carry out its specified function.

The ability to select a wireless carrier based on service compatibility levels ensures alleviates the problem of a wireless device 300 connecting to a carrier that is "preferred" based on a wireless carrier's business justifications, yet is technologically insufficient to support a communication protocol required by a wireless device 300.

Similarly, the ability to select a wireless carrier based on signal quality levels ensures that a wireless device 300 is not forced to connect with a "preferred" carrier that cannot adequately provide data services to the wireless device 300, and further prevents the wireless device from being forced into a "dead zone" where a compatible lesser-preferred wireless provider exists, but is deemed less-preferred and thus unusable to the wireless device 300 based on business considerations rather than environmental considerations in the field of operation.

At the same time, the ability to consider preference levels of various wireless carriers is important, as a particular carrier may offer better rates or other preferable contract terms. Depending on the particular criticality of an M2M application, varying selection criteria can be implemented. For example, a more critical application may select a lesser-preferred carrier more often to ensure the ability to communicate, notwithstanding potentially higher transmission costs, while a less critical application may select preferred wireless carriers more often to ensure the lowest possible cost of operation, not withstanding the potential for service unavailability.

Conventional devices simply offer no mechanism by which a "preferred" wireless carrier can be bypassed or disqualified from use, based on actual operational characteristics and environmental conditions. The ability for large consumers of wireless services to employ enhanced selection methodologies may provide an important negotiating tool by which such consumers can agree to use a preferred carrier but make such an agreement contingent upon a basic level of functionality or signal quality.

FIG. 4 is a flow diagram 400 illustrating a method within a wireless device for selecting a wireless carrier based upon available criteria, in accordance with one embodiment of the present invention.

Method 400 may be performed by processing logic that may include hardware (e.g., circuitry, dedicated logic, programmable logic, microcode, etc.), software (e.g., instructions run on a processing device to perform hardware simulation), or a combination thereof. In one embodiment, method 400 is performed by a computing device, such as wireless device 300 of FIG. 3.

Method 400 begins with processing logic in a wireless device receiving an SID via a wireless communication signal from a wireless carrier (block 405). At block 410, processing logic receives a second SID from a different wireless carrier. In some embodiments, a single wireless device may receive numerous SIDs, each broadcast from different wireless carriers, and then proceed select one of the wireless carriers based on available criteria.

At block 415, the wireless device searches its PRL for the SID associated with each wireless carrier. At block 420, processing logic determines a preference level for each wireless carrier based on the search of the PRL. For example, the wireless device searches the SID column of the PRL from the top down for the first SID received, and identifies the corresponding record or index. Then the wireless device searches the SID column of the PRL from the top down again, for the second SID received, and identifies the corresponding record or index, and so on. In some embodiments, the wireless device may search a table of SIDs most recently used within the wireless device to expedite the search, and if the SID is not found then proceed with a more expansive system table search having all available SIDs.

At block 425, processing logic in the wireless device reads a roaming code associated with the SID of each wireless carrier from the PRL (e.g., by referencing back to the identified index record or row associated with the SID).

At block 430, processing logic determines a service compatibility level for each wireless carrier based on the roaming code and a mapping of roaming codes to service compatibility levels. At block 435, the wireless device determines a service level requirement of an M2M application executing in the wireless device (e.g., by reading a configuration file of the application or reading stored parameter values of the application). At block 440 processing logic determines a signal quality level for each wireless carrier based on the wireless communication signal received (e.g., in conjunction with the signal analyzer and receiver/transceiver circuitry).

At block 445 processing logic computes a signal quality delta representing the difference in signal quality associated with each wireless carrier. For example, a preferred wireless carrier's signal quality level may be compared against a minimum threshold, and then a delta in signal quality may be computed signifying the difference in signal quality between a preferred carrier and one or more lesser preferred wireless carriers. The computed delta may then be compared against a minimum delta threshold to determine whether a preferred wireless carrier with a poorer signal quality should be bypassed in favor of an improved signal quality level from a less preferred wireless carrier.

At block 450, processing logic selects one of the wireless carriers based on the signal quality delta, the preference level of each wireless carrier, the service compatibility level of each wireless carrier, and the service level requirement of the M2M application. Fewer criteria, additional criteria, and other combinations may be used to make the determination.

At block 455, processing logic in the wireless device establishes a wireless communication session with the selected wireless carrier. The wireless communication session thus allows the wireless device to exchange telemetric data, instructions, event triggers, and information (e.g., wireless communication traffic) with a remote location, such as a central monitoring station.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a smart-phone, a wireless communication device such as a cellular handset operating via digital or analog wireless telephony communication protocols, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM), static memory, flash memory, static random access memory (SRAM), etc.), and a secondary memory 518 (e.g., a data storage device), which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and steps discussed herein.

The computer system 500 may further include a transmitter, receiver and signal analyzer component 508 (e.g., a wireless network interface device). The computer system 500 also may include a user interface 510 (e.g., a liquid crystal display (LCD) or a cathode ray tube (CRT)), an alphanumeric input device 512 (e.g., a keyboard), a cursor control device 514 (e.g., a mouse), and an integrated speaker 516 for transmitting telephony voice streams and audible notifications (e.g., a signal generation device).

Main memory 504 may include, for example, roaming code map 524 to map roaming codes associated with particular SIDs to services provided by a corresponding wireless carrier (e.g., Service compatibility levels), preferred roaming list 525 which provides roaming codes, preference levels, GEO groups, and other information for each SID, and selection unit 523 for comparing the information available and making a determination of which wireless carrier fits an array of criteria. Secondary memory 518 may include a machine-readable storage medium (or more specifically a computer-readable storage medium) 531 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-readable storage media. The software 522 may further be transmitted or received over a network 520 via the receiver, transmitter, signal analyzer component 508.

While the machine-readable storage medium 531 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

The present invention may include various steps, as described above, which may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having instructions stored thereon, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method in a wireless communication device comprising:
   receiving a first System Identification Number (SID) via a first wireless communication signal from a first wireless carrier operating within communication range of the wireless communication device;
   receiving one or more additional SIDs via one or more additional wireless communication signals from one or more additional wireless carriers operating within communication range of the wireless communication device;
   determining a signal quality level for each of the first and the additional wireless communication signals received from the first and additional wireless carriers respectively;
   determining a preference level for each of the first and additional wireless carriers based on a Preferred Roaming List (PRL); and
   selecting one wireless carrier from either the first wireless carrier or the additional wireless carriers based on the signal quality level of each wireless carrier and based further on the preference level for each wireless carrier, wherein selecting the one wireless carrier from either the first wireless carrier or the additional wireless carriers comprises:
      computing a signal quality delta representing the difference in value between the signal quality level of the first wireless carrier and the signal quality level of the additional wireless carriers;
      selecting the first wireless carrier when the preference level of the first wireless carrier is greater than the preference level of the additional wireless carriers and the signal quality delta is less than a threshold; and selecting one of the additional wireless carriers when the preference level of one of the additional wireless carriers is less than the preference level of the first wireless carrier and the signal quality delta is greater than or equal to the threshold.

2. The method of claim 1, further comprising establishing a wireless communication session with the wireless carrier selected.

3. The method of claim 1, further comprising:

determining a service compatibility level for each of the first wireless carrier and the additional wireless carriers based on a Preferred Roaming List (PRL); and wherein selecting the one wireless carrier from either the first wireless carrier or the additional wireless carriers comprises selecting the one wireless carrier based on 1) the signal quality level of each wireless carrier, 2) the preference level for each wireless carrier, and 3) the service compatibility level for each wireless carrier.

4. The method of claim 3, further comprising:

determining a service level requirement of a Machine-to-Machine (M2M) application executing in the wireless communication device; and wherein selecting the one wireless carrier from either the first wireless carrier or the additional wireless carriers comprises selecting the one wireless carrier based on 1) the signal quality level of each wireless carrier, 2) the preference level for each wireless carrier, 3) the service compatibility level for each wireless carrier; and 4) the service level requirement of the M2M application.

5. The method of claim 4, wherein:

the service level requirement of the M2M application describes one or more wireless communication protocols required by the M2M application; and the service compatibility level for each of the wireless carriers describes one or more wireless communication protocols available from the corresponding wireless carrier.

6. The method of claim 5, wherein determining the service compatibility level for each of the wireless carriers based on a Preferred Roaming List (PRL) comprises:

searching the PRL for the SID associated with each wireless carrier;

reading, from the PRL, a roaming code associated with the SID of each wireless carrier; and identifying the one or more wireless communication protocols available from the wireless carrier associated with the corresponding roaming code based on a mapping of roaming codes to service compatibility levels.

7. The method of claim 1, wherein determining the signal quality level for each of the wireless communication signals received from the wireless carriers comprises:

measuring, at the wireless communication device, one or more signal quality characteristics associated with the wireless communication signals received from the wireless carriers, wherein each of the one or more signal quality characteristics are selected from the group comprising:

a Received Signal Strength Indication (RSSI) representing a power level of the corresponding wireless communication signal as received at the wireless communication device;

a Signal-to-Noise Ratio (SNR) representing the ratio of signal power within the corresponding wireless communication signal in comparison to the amount of noise power corrupting the wireless communication signal;

a Frame Error Rate (FER) representing the number of frames within the corresponding wireless communication signal containing bit errors; and a Bit Error Rate (BER).

8. The method of claim 1, wherein the wireless communication device is selected from a group of wireless communication devices comprising:

a stationary Machine-to-Machine (M2M) wireless communications device;

a mobile M2M wireless device;

a utility meter monitoring station;

a residential security system;

a wireless modem communicatively interfaced with a laptop computer;

a Personal Digital Assistant (PDA);

a smart phone; and a cellular handset operating via digital or analog wireless telephony communication protocols.

9. A wireless communication device comprising:

means for receiving a first System Identification Number (SID) via a first wireless communication signal from a first wireless carrier operating within communication range of the wireless communication device;

means for receiving a second SID via a second wireless communication signal from a second wireless carrier operating within communication range of the wireless communication device;

means for determining a signal quality level for each of the first and second wireless communication signals received from the first and second wireless carriers respectively;

means for determining a preference level for each of the first and second wireless carriers based on a Preferred Roaming List (PRL);

means for selecting either the first wireless carrier or the second wireless carrier based on the signal quality level of each wireless carrier and based further on the preference level for each wireless carrier, wherein the means for selecting either the first wireless carrier or the second wireless carrier comprise:

means for computing a signal quality delta representing the difference in value between the signal quality level of the first wireless carrier and the signal quality level of the second wireless carrier;

means for selecting the first wireless carrier when the preference level of the first wireless carrier is greater than the preference level of the second wireless carrier and the signal quality delta is less than a threshold; and means for selecting the second wireless carrier when the preference level of the second wireless carrier is less than the preference level of the first wireless carrier and the signal quality delta is greater than or equal to the threshold; and means for establishing a wireless communication session with the wireless carrier selected.

10. The wireless communication device of claim 9, further comprising:

means for determining a service compatibility level for each of the first and second wireless carriers based on a Preferred Roaming List (PRL);

means for determining a service level requirement of a Machine-to-Machine (M2M) application executing in the wireless communication device; and wherein the means for selecting either the first wireless carrier or the second wireless carrier comprises means for selecting the first or the second wireless carrier based on 1) the signal quality level of each wireless carrier, 2) the preference level for each wireless carrier, 3) the service compatibility level for each wireless carrier; and 4) the service level requirement of the M2M application.

11. The wireless communication device of claim 10, wherein the means for determining the service compatibility level for each of the first and second wireless carriers based on a Preferred Roaming List (PRL) comprises:
- means for searching the PRL for the SID associated with each wireless carrier;
- means for reading, from the PRL, a roaming code associated with the SID of each wireless carrier; and
- means for identifying the one or more wireless communication protocols available from the wireless carrier associated with the corresponding roaming code based on a mapping of roaming codes to service compatibility levels.

12. The wireless communication device of claim 9, wherein the means for determining the signal quality level for each of the first and second wireless communication signals received from the first and second wireless carriers respectively comprises:
- means for measuring, at the wireless communication device, one or more signal quality characteristics associated with the first and second wireless communication signals received from the first and second wireless carriers respectively, wherein each of the one or more signal quality characteristics are selected from the group comprising:
- a Received Signal Strength Indication (RSSI) representing a power level of the corresponding wireless communication signal as received at the wireless communication device;
- a Signal-to-Noise Ratio (SNR) representing the ratio of signal power within the corresponding wireless communication signal in comparison to the amount of noise power corrupting the wireless communication signal;
- a Frame Error Rate (FER) representing the number of frames within the corresponding wireless communication signal containing bit errors; and
- a Bit Error Rate (BER).

13. The wireless communication device of claim 9, wherein the wireless communication device is selected from a group of wireless communication devices comprising:
- a stationary Machine-to-Machine (M2M) wireless communications device;
- a mobile M2M wireless device;
- a utility meter monitoring station;
- a residential security system;
- a wireless modem communicatively interfaced with a laptop computer;
- a Personal Digital Assistant (PDA);
- a smart phone; and
- a cellular handset operating via digital or analog wireless telephony communication protocols.

14. A computer readable storage medium having instructions stored thereon that, when executed by a processor in a wireless communications device, cause the wireless communications device to perform a method comprising:
- receiving a first System Identification Number (SID) via a first wireless communication signal from a first wireless carrier operating within communication range of the wireless communication device;
- receiving a second SID via a second wireless communication signal from a second wireless carrier operating within communication range of the wireless communication device;
- determining a signal quality level for each of the first and second wireless communication signals received from the first and second wireless carriers respectively;
- determining a preference level for each of the first and second wireless carriers based on a Preferred Roaming List (PRL);
- selecting either the first wireless carrier or the second wireless carrier based on the signal quality level of each wireless carrier and based further on the preference level for each wireless carrier, wherein selecting either the first wireless carrier or the second wireless carrier comprises:
  - computing a signal quality delta representing the difference in value between the signal quality level of the first wireless carrier and the signal quality level of the second wireless carrier;
  - selecting the first wireless carrier when the preference level of the first wireless carrier is greater than the preference level of the second wireless carrier and the signal quality delta is less than a threshold; and
  - selecting the second wireless carrier when the preference level of the second wireless carrier is less than the preference level of the first wireless carrier and the signal quality delta is greater than or equal to the threshold; and
- establishing a wireless communication session with the wireless carrier selected.

15. The computer readable storage medium of claim 14, wherein the instructions cause the wireless communication device to perform the method further comprising:
- determining a service compatibility level for each of the first and second wireless carriers based on a Preferred Roaming List (PRL);
- determining a service level requirement of a Machine-to-Machine (M2M) application executing in the wireless communication device; and wherein
- selecting either the first wireless carrier or the second wireless carrier comprises selecting the first or the second wireless carrier based on 1) the signal quality level of each wireless carrier, 2) the preference level for each wireless carrier, 3) the service compatibility level for each wireless carrier; and 4) the service level requirement of the M2M application.

16. The computer readable storage medium of claim 15, wherein determining the service compatibility level for each of the first and second wireless carriers based on a Preferred Roaming List (PRL) comprises:
- searching the PRL for the SID associated with each wireless carrier;
- reading, from the PRL, a roaming code associated with the SID of each wireless carrier; and
- identifying the one or more wireless communication protocols available from the wireless carrier associated with the corresponding roaming code based on a mapping of roaming codes to service compatibility levels.

17. The computer readable storage medium of claim 14, wherein determining the signal quality level for each of the first and second wireless communication signals received from the first and second wireless carriers respectively comprises:
- measuring, at the wireless communication device, one or more signal quality characteristics associated with the first and second wireless communication signals received from the first and second wireless carriers respectively, wherein each of the one or more signal quality characteristics are selected from the group comprising:

a Received Signal Strength Indication (RSSI) representing a power level of the corresponding wireless communication signal as received at the wireless communication device;

a Signal-to-Noise Ratio (SNR) representing the ratio of signal power within the corresponding wireless communication signal in comparison to the amount of noise power corrupting the wireless communication signal;

a Frame Error Rate (FER) representing the number of frames within the corresponding wireless communication signal containing bit errors; and a Bit Error Rate (BER).

* * * * *